(12) United States Patent
Kobayashi et al.

(10) Patent No.: US 8,539,546 B2
(45) Date of Patent: Sep. 17, 2013

(54) SECURITY MONITORING APPARATUS, SECURITY MONITORING METHOD, AND SECURITY MONITORING PROGRAM BASED ON A SECURITY POLICY

(75) Inventors: Emiko Kobayashi, Yokohama (JP); Kiminori Sugauchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 192 days.

(21) Appl. No.: 13/058,122

(22) PCT Filed: Nov. 19, 2010

(86) PCT No.: PCT/JP2010/006803
§ 371 (c)(1),
(2), (4) Date: Feb. 8, 2011

(87) PCT Pub. No.: WO2012/053041
PCT Pub. Date: Apr. 26, 2012

(65) Prior Publication Data
US 2012/0102542 A1  Apr. 26, 2012

(30) Foreign Application Priority Data
Oct. 22, 2010   (JP) ................................ 2010-237996

(51) Int. Cl.
*G06F 17/00*   (2006.01)
*H04L 29/06*   (2006.01)

(52) U.S. Cl.
USPC .......................................................... 726/1

(58) Field of Classification Search
USPC .......................................................... 726/1
See application file for complete search history.

(56) References Cited

U.S. PATENT DOCUMENTS

| | | | |
|---|---|---|---|
| 6,971,026 B1 | 11/2005 | Fujiyama et al. | |
| 2005/0193250 A1 | 9/2005 | Takeuchi et al. | |
| 2008/0168135 A1* | 7/2008 | Redlich et al. | 709/204 |
| 2008/0270373 A1* | 10/2008 | Oostveen et al. | 707/5 |
| 2010/0064342 A1 | 3/2010 | Nakagawa | |

FOREIGN PATENT DOCUMENTS

| | | |
|---|---|---|
| JP | 2001-101135 | 4/2001 |
| JP | 2002-352062 | 12/2002 |
| JP | 2005-190066 | 7/2005 |
| JP | 2009-048317 | 3/2009 |
| WO | WO 2008/004498 A1 | 1/2008 |
| WO | WO 2008/149859 A1 | 12/2008 |

OTHER PUBLICATIONS

PCT Written Opinion on application No. PCT/JP2010/006803 mailed Dec. 21, 2010; 7 pages.

* cited by examiner

*Primary Examiner* — Kambiz Zand
*Assistant Examiner* — Stephen Sanders
(74) *Attorney, Agent, or Firm* — Foley & Lardner LLP

(57) ABSTRACT

A management server monitors even the occurrence of items, which are not targets of security policies, evaluates a change of the monitoring result, and implements specific output when necessary. Particularly, also regarding items which are considered to be non-targets of the security policies in management based on the security policies, the occurrence of such items is also monitored and the monitoring result is appropriately reported to an administrator so that the administrator can recognize a threat and takes necessary countermeasure at appropriate timing.

20 Claims, 11 Drawing Sheets

FIG.6

| POLICY ID | CONTENT | TARGET | MONITOR ITEM |
|---|---|---|---|
| 1 | SECURITY PATCH IS THE LATEST VERSION | APPLIED | C1 |
| 2 | HDD PASSWORD SETTING IS ESSENTIAL | EXCLUDED | C2 |
| 3 | INTERNAL USE ONLY | EXCLUDED | C3 |
| | | | |

FIG.7

| MONITOR ITEM ID | MONITORED CONTENT | POLICY SETTING |
|---|---|---|
| C1 | OS SECURITY PATCH VERSION | YES |
| C2 | WHETHER HDD PASSWORD EXISTS OR NOT | NO |
| C3 | NO NETWORK CONNECTION FOR CERTAIN PERIOD OF TIME | NO |
| | ⋮ | |
| C11 | WHETHER BIOS PASSWORD EXISTS OR NOT | NO |
| | ⋮ | |

| RULE ID | THREAT | PROPAGATION RULE | MONITOR ITEMS |
|---|---|---|---|
| 1 | THREAT EVENT 1 | CAUSAL EVENT A * CAUSAL EVENT B * CAUSAL EVENT C | C2,C3 |
| 2 | THREAT EVENT 2 | (CAUSAL EVENT A + CAUSAL EVENT D) * CAUSAL EVENT E | C11,C14,C15 |
| 3 | THREAT EVENT 3 | CAUSAL EVENT F * (CAUSAL EVENT H + CAUSAL EVENT I) | C16,C17,C18 |
| | | ⋮ | |

801 802 803 804

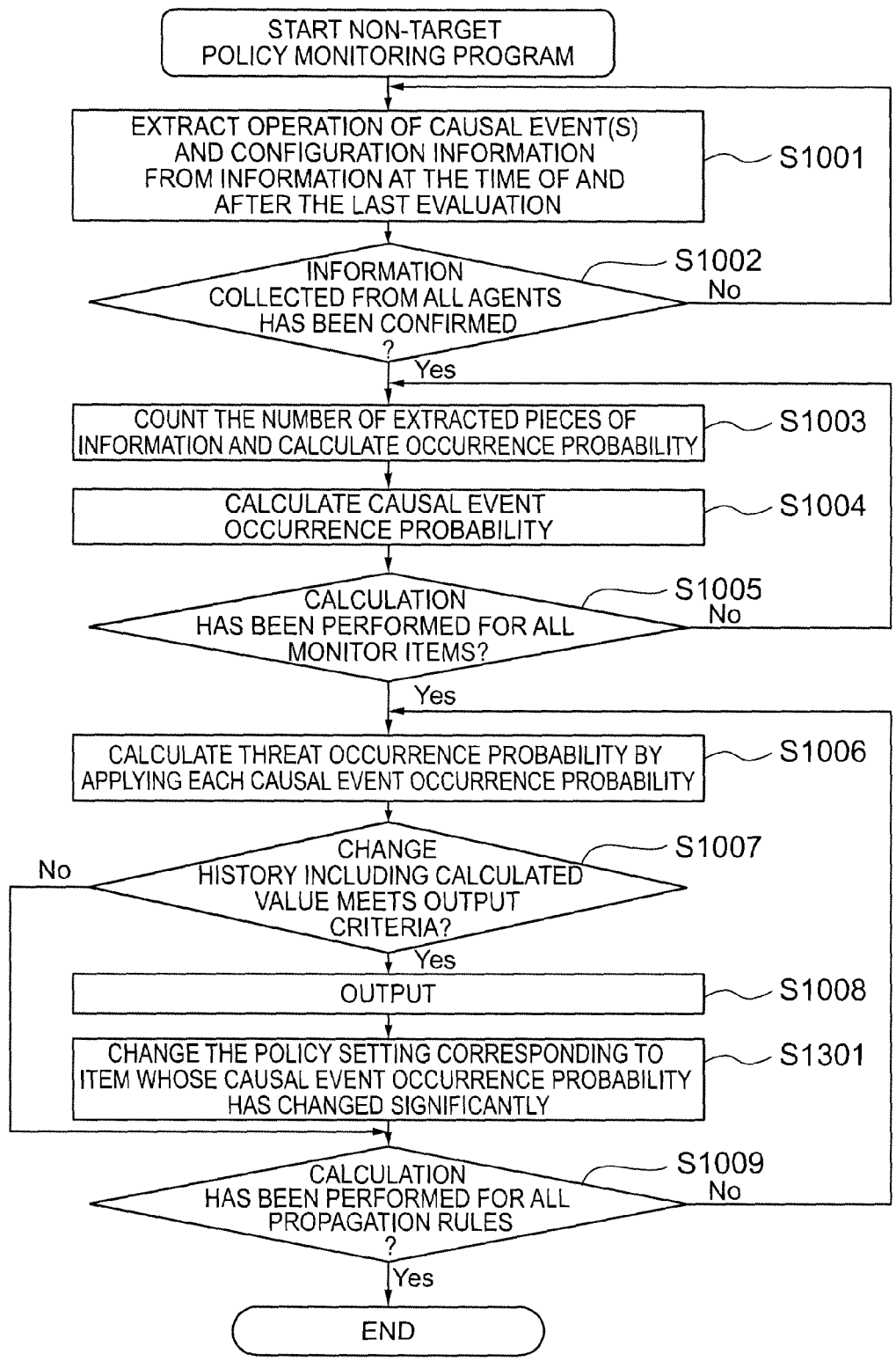

SECURITY MONITORING APPARATUS, SECURITY MONITORING METHOD, AND SECURITY MONITORING PROGRAM BASED ON A SECURITY POLICY

CROSS-REFERENCE TO RELATED PATENT APPLICATIONS

This application is a US national phase application of Application PCT/JP2010/006803 filed Nov. 19, 2010 which claims priority from Japan Application 2010-237996, filed Oct. 22, 2010. All of the aforesaid applications are incorporated herein by reference in their entirety as if fully set forth herein.

TECHNICAL FIELD

The present invention relates to a security monitoring apparatus, security monitoring method, and security monitoring program for performing security monitoring of an information system based on security policies. Particularly, the invention is suited for use in analysis of security threats and their causes.

BACKGROUND ART

As the role of information systems becomes important in accordance with the development in the information industry, recently, the importance of security management has been increasing. For the security management of such information systems, security risks are analyzed based on, for example, discovery of threats and vulnerability and their occurrence probabilities, security policies are designed, and necessary countermeasures are taken. Regarding implementation of security countermeasures, there is a method for analyzing risks based on whether vulnerability exists or not, vulnerability occurrence frequency, and an asset value as the status of a system in operation (see Patent Literature 1). There is another method for updating a risk value based on an asset value of information and file access information; and executing countermeasure processing such as access limitations if the risk value exceeds a designated threshold (see Patent Literature 2).

CITATION LIST

Patent Literature

[PTL 1]
International Publication WO 2008-004498
[PTL 2]
Japanese Patent Application Laid-Open (Kokai) Publication No. 2005-190066

SUMMARY OF INVENTION

Technical Problem

If proposed countermeasure candidates are presented for a conventional information system as described above, it is an administrator who makes a final decision on a countermeasure to be actually implemented and security policies for the information system. Security threats to such an information system may be sometimes caused by the usage thereof, other than threats caused by a user behavior such as information leakage. When designing the security policies, the administrator may sometimes set a preference to, for example, suppress the operation of a terminal device such as a computer as a countermeasure against a user behavior which might cause a threat. However, with the conventional information system, there are a case where the setting to suppress the operation is not made in consideration of convenience, and a case where the user behavior itself cannot be suppressed by the setting to the terminal device, for example, when the user takes out the terminal device.

Furthermore, also with regard to conventional security management tools, if the administrator sets certain items as security policies, it is common practice to monitor and evaluate whether the items are observed or not. However, items which are not set as security policies as described above when designing the security policies will not be monitored.

The present invention was devised in consideration of the circumstances described above and aims at suggesting a security monitoring apparatus, security monitoring method, and security monitoring program for enabling the administrator to recognize threats and take necessary countermeasures by monitoring the occurrence of policies, which are decided to be non-targets at the time of designing security policies, and outputting the monitoring result at appropriate timing.

Solution to Problem

In order to solve the above-described problems, the present invention is characterized in that a security monitoring apparatus for managing at least one terminal device comprises: a management program for, when applying a security policy to each of the terminal devices, managing the security policy by classifying items of the security policy into a set item which is set as an item of the security policy and a non-set item which is not set as an item of the security policy; a collection program for monitoring the occurrence of a causal event, which may possibly cause a threat with respect to the non-set item on each of the terminal devices, and collecting information regarding the occurrence of the causal event; and a non-target policy monitoring program for evaluating a change of the causal event based on the information regarding the causal event and implementing specific output if the change of the causal event is equal to or more than a reference value.

Also, the present invention is characterized in that the following steps are executed on a computer: a management step whereby a management program manages, when applying a security policy to each of the terminal devices, the security policy by classifying items of the security policy into a set item which is set as an item of the security policy and a non-set item which is not set as an item of the security policy; a collection step whereby a collection program monitors the occurrence of a causal event, which may possibly cause a threat with respect to the non-set item on each of the terminal devices, and collects information regarding the occurrence of the causal event; and a non-target policy monitoring step whereby a non-target policy monitoring program evaluates a change of the causal event based on the information regarding the causal event and implements specific output if the change of the causal event is equal to or more than a reference value.

Also, the present invention is characterized in that the following programs are executed on a computer: a management program for, when applying each security policy to at least one terminal device, managing the security policy by classifying items of the security policy into a set item which is set as an item of the security policy and a non-set item which is not set as an item of the security policy; a collection program for monitoring the occurrence of a causal event, which may possibly cause a threat with respect to the non-set item on each of the terminal devices, and collecting information regarding the occurrence of the causal event; and a non-target policy monitoring program for evaluating a change of the causal event based on the information regarding the causal event and implementing specific output if the change of the causal event is equal to or more than a reference value.

Also, in the present invention a security monitoring method for a system including at least one terminal device is characterized in that a monitoring module monitors the occurrence of a causal event which may possibly cause a security threat, a calculation module calculates an occurrence probability thereof and an occurrence probability of an influenced threat based on the occurrence probability of the causal event, and an evaluation module evaluates a change of the calculated value after the elapse of time and implements specific output if the change is equal to or more than a reference value.

Advantageous Effects of Invention

Since information about threats, which become increasingly likely to be actualized, their causes, and countermeasures against them are provided according to the present invention also with respect to potential threats which are not recognized by the administrator and are non-targets of the security policies, the administrator can recognize threats and take necessary countermeasures at appropriate timing.

BRIEF DESCRIPTION OF DRAWINGS

FIG. 6 is a diagram showing a table configuration of a policy management table.

FIG. 7 is a diagram showing a table configuration of a monitor item management table.

FIG. 13 is a flowchart illustrating an example of a processing sequence executed by the non-target policy monitoring program according to a second embodiment.

DESCRIPTION OF EMBODIMENTS

An embodiment of the present invention will be explained in detail with reference to the attached drawings.

(1) Concept of the Present Embodiment

In the present embodiment, in a system equipped with at least one terminal device(s) when setting a security policy to each of the terminal devices, the security policy is managed by classifying some items, some of which is set as the security policy, and some of which is not set as the security policies. When managing an ordinary security policy, only an item which is set as it (hereinafter referred to as the set item) is a monitoring target, while an item which is not set as it (hereinafter referred to as the non-set item) is not a monitoring target.

However, such non-set item is also considered to be a monitor target in the present embodiment because of the following reason. That is, for example, based on the idea that although the setting is made by the administrator, if the non-set item is not monitored at all because it is non-set items, that would be too vulnerable to potential threats, this non-set item (which correspond to the monitor item described later) is set as the monitor target by way of caution and the administrator is notified whenever necessary, as specific output, that potential security risks may occur from now on.

In the present embodiment, a user terminal is used as an example of a terminal device; however, the terminal device may be other electronic equipment such as a computer. The present embodiment is concretely explained below. Incidentally, the term propagation rule(s) will be used in the following explanation; and the propagation rule(s) means a combination of events which may possibility cause the occurrence of a certain threat (which correspond to causal events described later). Furthermore, a monitor item will be defined for each causal event as described later. Incidentally, the same causal event may be included in propagation rules for different threats.

Figure 1:
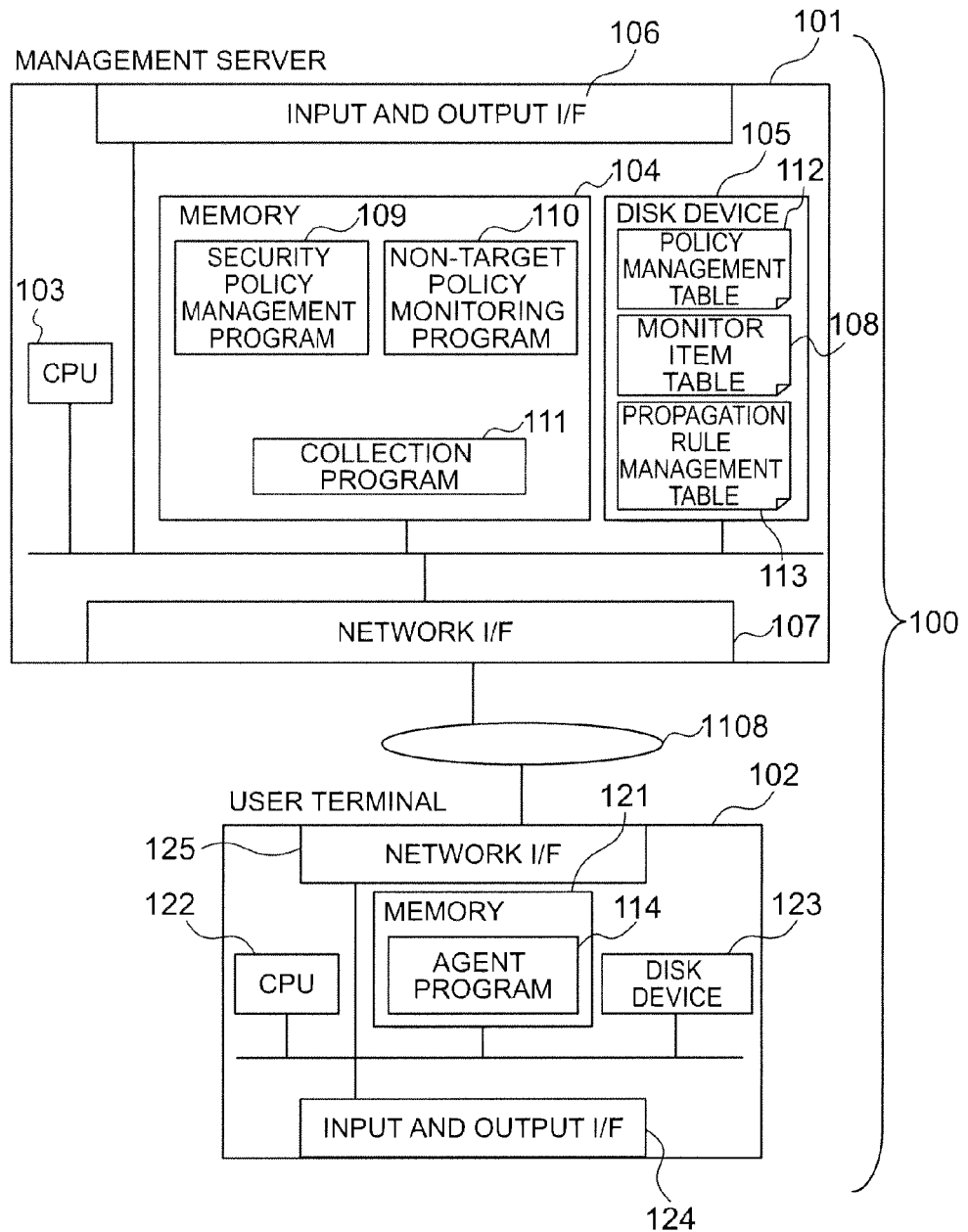
FIG. 1 is a diagram showing a hardware and logical configuration of a system according to a first embodiment.

(2) First Embodiment (2-1) Hardware and Logical Configuration (2-1-1) Entire System FIG. 1 shows a hardware and logical configuration of a system 100 in the first embodiment. This system 100 includes a management server 101, at least one user terminal 102, and a network 1108. The management server 101 is an example of a security risk visualization device. For example, a plurality of user terminals 102 exist, users directly operate and use them, and the user terminals 102 are terminal devices which are management targets in accordance with a security policy.

Each of the management server 101 and the user terminal 102 includes one or more central processing units (hereinafter referred to the CPU) 103, a memory 104, a secondary storage device 105 such as a hard disk drive, an I/O interface 106, and a network interface 107. The I/O interface 106, from among those components, has a function controlling input information from a keyboard and a mouse and output information to a display. Also, the network interface 107 is an interface for connection to the network 1108.

A security policy management program 109, a non-target policy monitoring program 110, and a collection program 111 are loaded to the memory 104 for the management server 101. Programs such as the security policy management program 109, the non-target policy monitoring program 110, and the collection program 111 are executed by the CPU 103. Furthermore, the disk device 105 stores information of a policy management table 112 and a propagation rule management table 113.

Each user terminal 102 includes a CPU 122, a memory 121, a disk device 123, and a network interface (hereinafter referred to as the I/F) 125, and an I/O interface 124. An agent program 114 is loaded to the memory 121 from among the above-mentioned components and is executed by the CPU 122. This agent program 114 has a normal function obtaining an operation log by a user of the user terminal 102 and configuration information as described later.

(2-1-2) Relationship Between Programs and Tables in Management Server

Figure 2:
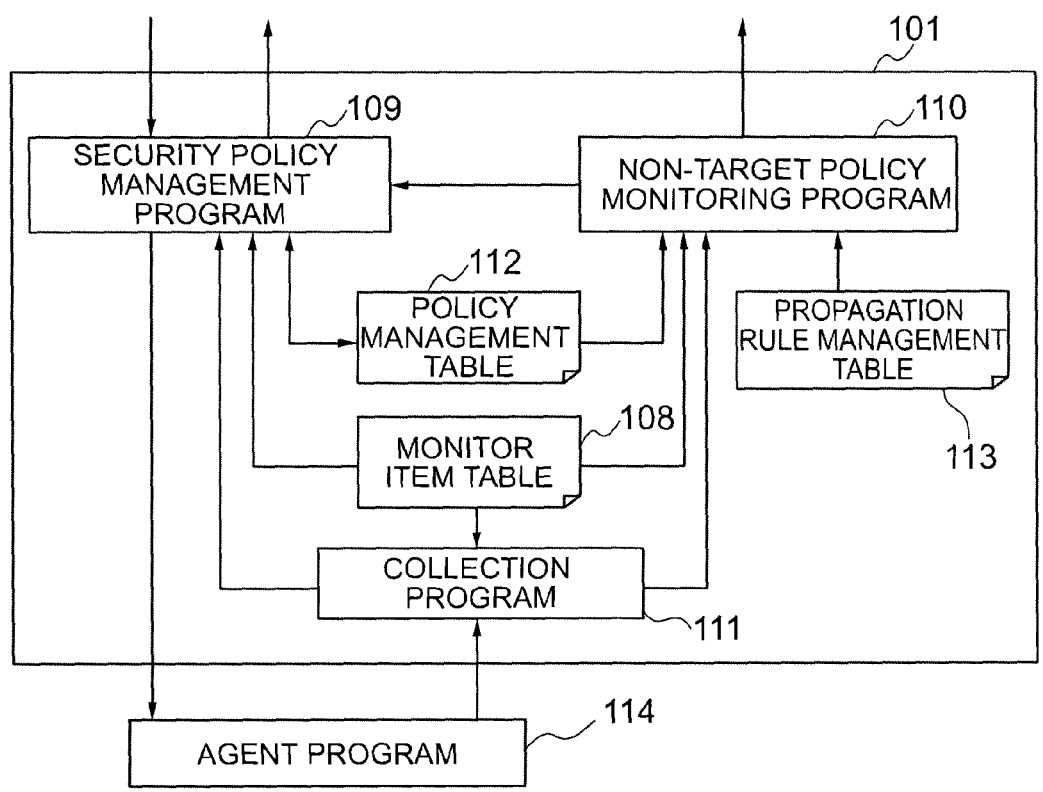
FIG. 2 is a module configuration diagram showing the relationship between programs and tables executed in a management server.

FIG. 2 shows the relationship between each program and table in the management server 101. The security policy management program 109, which corresponds to an example of a management program, performs, for example, input and output by an user, registration to and reading from the policy management table 112, and further sends a security policy to the agent program 114. The non-target policy monitoring program 110 corresponds to an example of a monitoring program, which refers to the policy management table 112 and the propagation rule management table 113 and performs output to the user. Furthermore, each of the security policy management program 109 and the non-target policy monitoring program 110 uses information collected by the collection program 111 and evaluates a change of the occurrence probability of threats after the elapse of time with respect to the aforementioned non-set items. This collection program 111 collects information from the agent program 114 for the user terminal 102.

(2-1-3) Definition of Security Policies

The term security policies (hereinafter also abbreviated to as the policies) herein used indicates security policies for the entire system 100 including the management server 101, the network equipment, and the user terminal 102; however, as an example, the term security policies indicates policies about at least either the operation or setting of the user terminal 102. As such policies, for example, there are items regarding software installation such as mandatory software or prohibited software, items regarding OS settings such as activating a screen saver or firewall, items regarding control of the terminal device such as suppression of connection to external storage media or suppression of application activation, and items for stipulating user behaviors such as prohibition of mail transmission to external addresses or prohibition of taking out the terminal device.

(2-1-4) Functional Module Configuration of Non-Target Policy Monitoring Program

Figure 3:
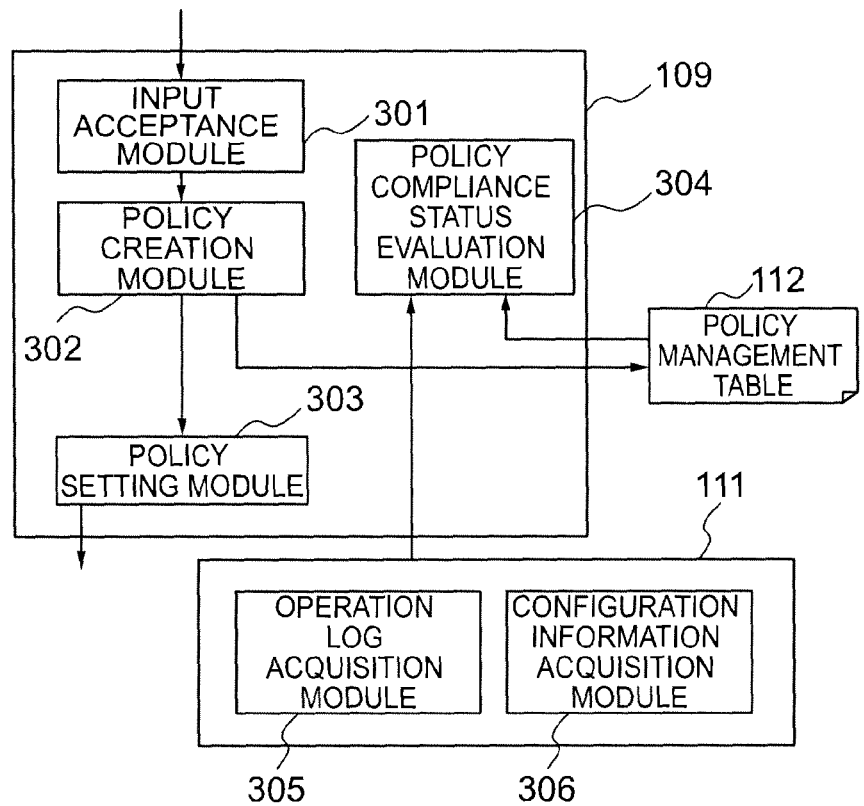
FIG. 3 is a block diagram showing a functional module configuration of a security policy management program.

FIG. 3 shows a functional module configuration of the security policy management program 109. The security policy management program 109 has an input acceptance module 301, a policy creation module 302, a policy setting module 303, and a policy compliance status evaluation module 304.

The input acceptance module 301 accepts input about policy settings from the user. The policy creation module 302 creates policies to be applied to at least either one of, for example, the user terminal 102 and the system. The policy setting module 303 distributes and sets policies to the user terminal 102 which is a management target. The created policies are registered in and managed by the policy management table 112. The policy compliance status evaluation module 304 monitors and evaluates whether the set policies are observed by each user terminal 102. The policy compliance status evaluation module 304 reads the content of the policy management table 112 and performs evaluation based on the content.

Furthermore, the collection program 111 for the management server 101 has an operation log acquisition unit 305 and a configuration information acquisition module 306. The operation log acquisition unit 305 collects an operation log at the user terminal 102 from the agent program 114 for the user terminal 102. On the other hand, the configuration information acquisition module 306 collects configuration information of the user terminal 102.

(2-1-5) Functional Module Configuration of Non-Target Policy Monitoring Program

Figure 4:
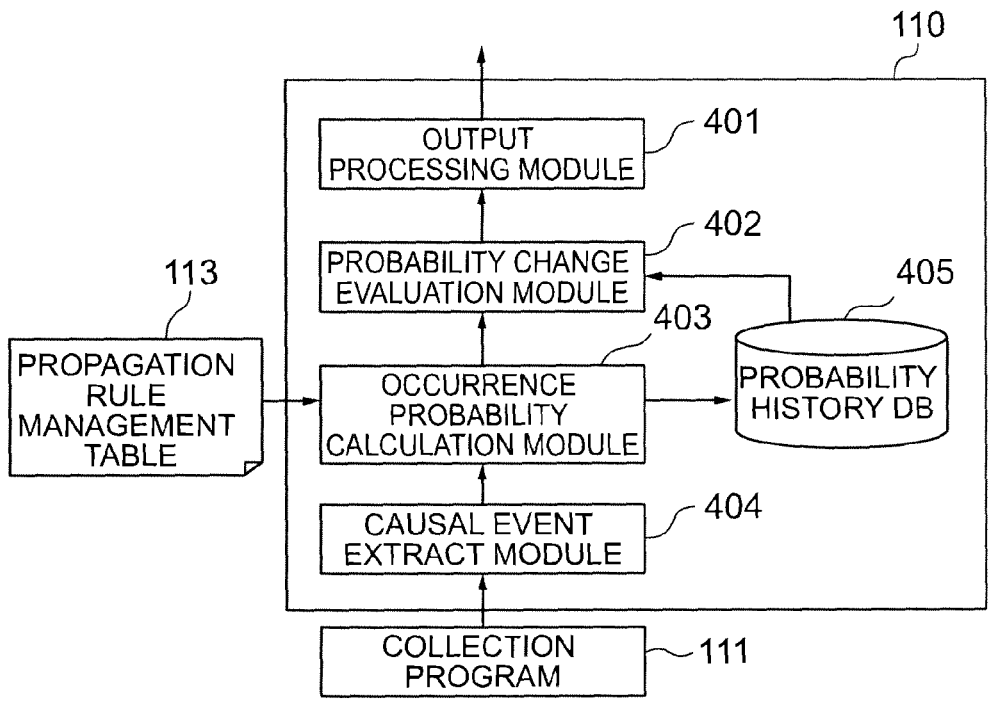
FIG. 4 is a block diagram showing a functional module configuration of a non-target policy monitoring program.

FIG. 4 shows a functional module configuration of the non-target policy monitoring program 110. The non-target policy monitoring program 110 includes a causal event extract module 404, an occurrence probability calculation module 403, a history database 405 (a probability history DB in the drawing), a probability change evaluation module 402, and an output processing module 401.

The causal event extract module 404 extracts whether a causal event exists or not, based on the operation log and configuration information of the user collected from each agent program 114. The occurrence probability calculation module 403 reads propagation rules from the propagation rule management table 113 and calculates a probability of threat occurrence based on the propagation rules according to the occurrence probabilities of causal events. The history database 405 is a database for retaining the calculated probabilities. The probability change evaluation module 402 has a function evaluating the probability history. The output processing module 401 has a function outputting the evaluation results.

(2-2) Security Monitoring Method

The system in the first embodiment is configured as described above. Next, an example of a security monitoring method which is part of an operation example of the system will be explained.

(2-2-1) Processing by Security Policy Management Program

Figure 5:
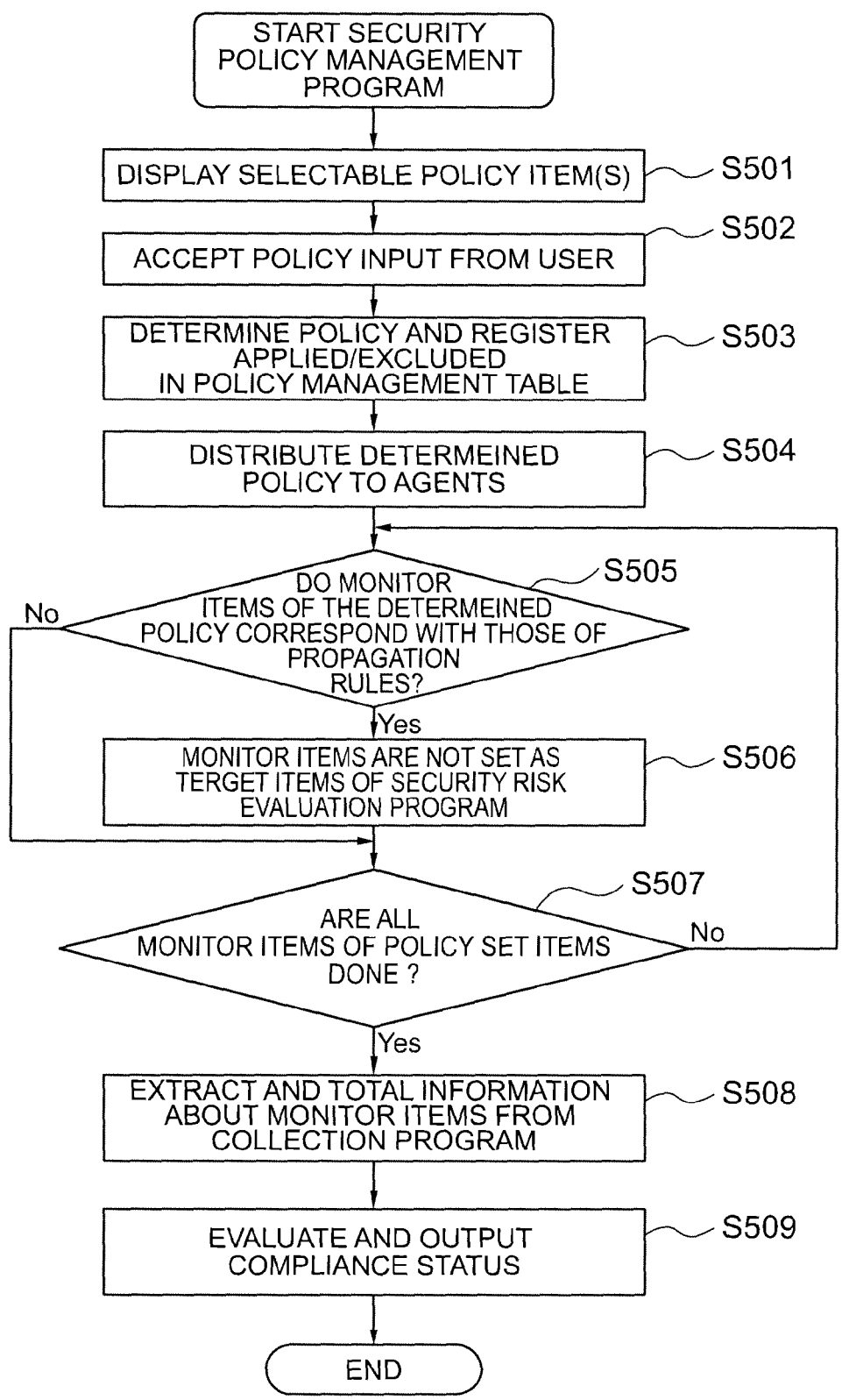
FIG. 5 is a flowchart illustrating an example of a processing sequence executed by the security policy management program.

FIG. 5 shows a flowchart of the security policy management program 109 for the management server 101. Incidentally, in this management server 101, the CPU 103 executes each command from the security policy management program 109 and this security policy management program 109 executes each step as described below under the control of the CPU 311. However, the following explanation will be given by using a simplified expression, stating that the security policy management program 109 executes each step.

The management server 101 displays items that can be set as policies. In response, the user selects the item(s) by using an input interface (not shown in the drawing) (S501) and performs input. The security policy management program 109 accepts the above-mentioned input from the user (S502), decides policies to be set, and registers them in the policy management table 112 (S503). Furthermore, the security policy management program 109 distributes the policies, which are set as described above, to the agent program 114 for the management server 101 (S504). Incidentally, the input from the user does not have to be of the above-described selection form, and may be of a description form for defining a description method.

Furthermore, the propagation rule management table 113 used by the non-target policy monitoring program 110 retains monitor items corresponding to propagation rules. The security policy management program 109 compares monitor items for the decided policies with monitor items for the propagation rules (S505) and judges that the matching items should not be target items of the non-target policy monitoring program 110 because they will be evaluated to check the status of whether the policies are observed or not (hereinafter referred to as the policy compliance status evaluation)) (S506). The security policy management program 109 applies such judgment to the monitor items of all the set policies (S507).

Now, as another method for the administrator to decide policies, the security policy management program 109 may search the policy management table 112 for policies corresponding to monitor items included in the propagation rules and outputs the found monitor items as selectable policies, thereby presenting them to the administrator. The security policy management program 109 may apply policies selected by the administrator from among the policies, which have been output as described above, and manage other policies as excluded policies. Monitor items corresponding to the excluded policies become target items of the non-target policy monitoring program 110.

The security policy management program 109 monitors and evaluates the compliance status with respect to the set policies. The security policy management program 109 extracts information according to the items from the operation log and configuration information collected from the user terminal 102 (S508) and gathers the information about all the target terminals, thereby evaluating the compliance status. The security policy management program 109 performs the evaluation and outputs the evaluation results regularly or whenever a request is made from the user (S509).

The agent program 114 in the user terminal 102 receives the policies from the management server 101 and makes settings to the OS or registry with respect to items for which the settings are required in accordance with the received policies. This agent program 114 monitors not only the policy set items, but all the monitors items as the monitor targets. At the same time, this agent program 114 records the user operation. Furthermore, the agent program 114 sends monitoring information to the management server 101 regularly or in response to a request from the management server 101.

(2-2-2) Table Configuration of Security Policy Management Table

FIG. 6 shows a table configuration of the security policy management table 112 managed by the management server 101. The security policy management table 112 is a table for managing the policies and includes a policy ID field 601, a content field 602, a target field 603, and a monitor item field 604.

The policy ID field 601 is an identifier for identifying the relevant policy. The content field 602 describes the content of the relevant policy corresponding to the policy ID field 601. The target field 603 shows whether the relevant policy is to be applied as a policy. The monitor item field 604 describes the content of a monitor item corresponding to the relevant policy.

One or more monitor items are defined for a policy and are monitored, thereby evaluating the compliance status. Incidentally, two or more monitor items may exist for one policy, and one monitor item may be a monitor item for different policies.

(2-2-3) Table Configuration of Monitor Item Table

FIG. 7 shows a configuration example for the monitor item table 108 for managing monitor items. This monitor item table 108 includes, relative to a monitor item ID 701, the monitored content 702 and a target field 703 for managing whether the relevant monitor item is a monitor target as a policy. The monitoring results of the policy target items (which correspond to the set items) will be targets of the policy compliance status evaluation and the policy non-target items (which correspond to the non-set items) will be targets of the non-target policy monitoring program 110 described later.

(2-2-4) Table Configuration of Propagation Rule Management Table 113

Figure 8:
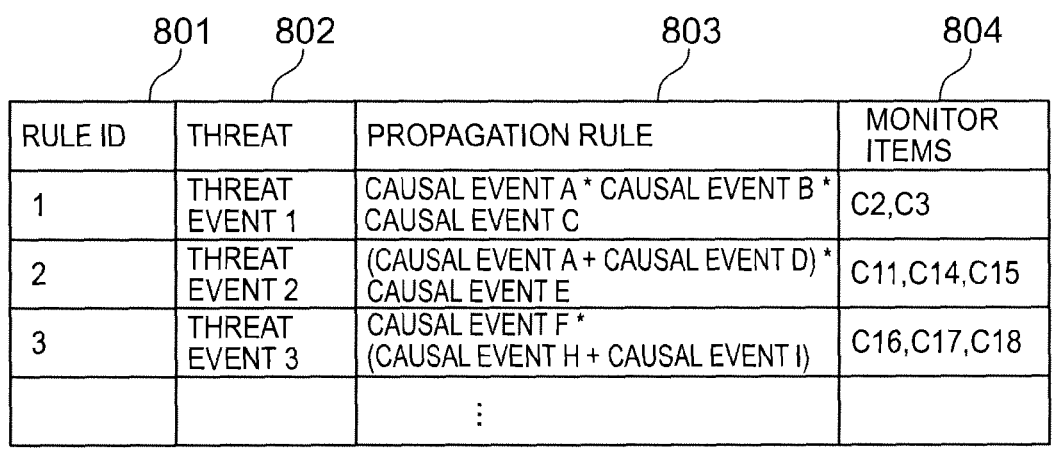
FIG. 8 is a diagram showing a table configuration of a propagation rule management table.

FIG. 8 shows the configuration of the propagation rule management table 113 managed by the management server 101. The propagation table management table 113 includes a rule ID field 801, a threat field 802, a propagation rule field 803, and a monitor item field 804.

The rule ID field 801 is a field for identifying each propagation rule. The threat field 802 is a field for mutually identifying a plurality of threats. The propagation rule field 803 is a field showing a formula of the relevant propagation rule. The monitor item field 804 is a field showing monitor items corresponding to the relevant propagation rule.

In this table, a propagation rule is expressed with a combination of causal events and the monitor items are defined for each causal event. Incidentally, the same causal event may be included in propagation rules for different threats. Furthermore, the monitor items are managed with the monitor item IDs indicated in the monitor item table 108 shown in FIG. 7.

(2-3) Combinations of Causal Events

Figure 9:
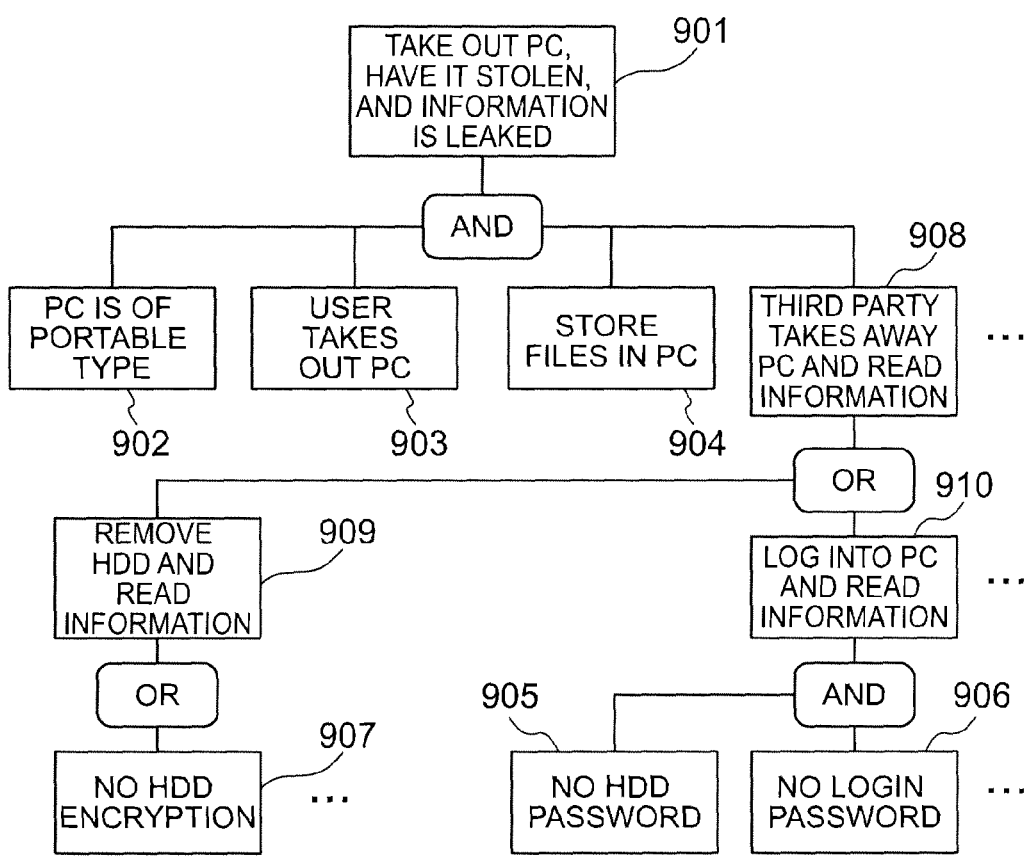
FIG. 9 is a diagram showing an example of a tree illustrating a structure of combinations of threats and their causal events for propagation rules.

FIG. 9 shows an example of a tree showing the structure of combinations of threats with their causal events as propagation rules. In the present embodiment, causal events are defined for events, which are threats in terms of security, and the propagation to the occurrence is further defined by the combinations of the causal events. Incidentally, this example does not show all the causal events for threats, but addresses and shows some causal events.

Threat Event 1 [The user takes out the user terminal and has it stolen and information is leaked] (901)

Causal Event A [The user terminal is of a portable type] (902)

Causal Event B [Files are stored in the user terminal] (903)

Causal Event C [The user takes out the user terminal] (904)

Causal Event D [No HDD password is set to the user terminal] (905)

Causal Event E [No login password is set to the user terminal] (906)

Causal Event F [HDD for the user terminal is not encrypted] (907)

Incidentally, events 908 to 910 other than the causal events and the threat events indicate the state, but they have nothing to do with the propagation rules, so an explanation thereof has been omitted. Also, the HDD (Hard Disk Drive) is an example of the disk device 123 mentioned earlier.

In this case, the propagation rule is expressed as follows: Threat Event=[Causal Event A]*[Causal Event B]*[Causal Event C]*{([Causal Event D]+[Causal Event E])+[Causal Event F]}. In this formula, the sign * represents logical multiplication (which corresponds to AND in the drawing) and the sign + represents logical sum (which corresponds to OR in the drawing). In the present embodiment, the non-target policy monitoring program 110 calculates the occurrence probability of the threat by using a combination of the Logical multiplication or the Logical sum of the occurrence probability of one or more causal events. Specifically speaking, the non-target policy monitoring program 110 finds the occurrence probability of each causal event and applies it to the propagation rule, thereby calculating the occurrence probability of the threat event.

(2-4) Processing by Non-Target Policy Monitoring Program

Figure 10:
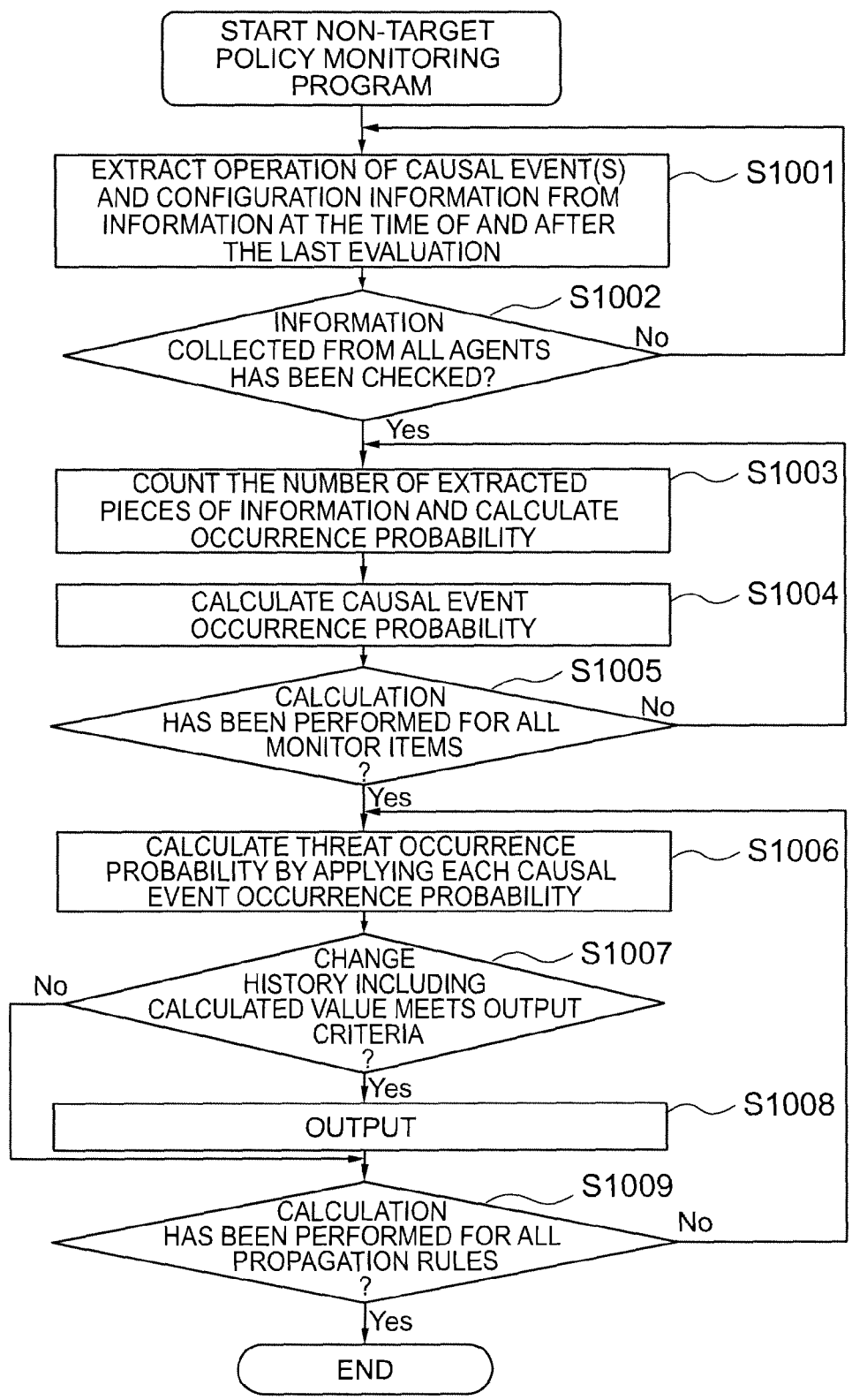
FIG. 10 is a flowchart illustrating an example of a processing sequence executed by the non-target policy monitoring program.

FIG. 10 shows a flowchart of the non-target policy monitoring program 110 for the management server 101. Incidentally, in this management server 101, the CPU 103 executes each command from the non-target policy monitoring program 110 and this non-target policy monitoring program 110 executes each step as described below under the control of the CPU 311. However, the following explanation will be given by using a simplified expression, stating that the non-target policy monitoring program 110 executes each step. Similarly, a simplified expression will be used also for the collection program 111.

The non-target policy monitoring program 110 extracts necessary items for monitoring the causal events which are monitor target items, from the operation log and the configuration information collected by the collection program 111 from the user terminal 102 (S1001). The non-target policy monitoring program 110 extracts a record of, for example, File Storage from the operation log with respect to the causal event B.

The non-target policy monitoring program 110 executes the above-described extraction processing for the information collected from all the agent programs 114 (which correspond to the agents in the drawing) (S1002) and counts the extracted result for each monitor item (S1003). Furthermore, the non-target policy monitoring program 110 calculates the occurrence probability of the causal event corresponding to the monitor item (S1004). If the non-target policy monitoring program 110 monitors, for example, HDD passwords based on the configuration information from 1000 user terminals 102 and there are ten user terminals 102 to which no HDD password is set, the occurrence probability of the causal event D is calculated as 10/1000=0.01.

The non-target policy monitoring program 110 stores the calculated value in the history database 405. As a result, the monitor item and its occurrence probability as well as the threat event and its occurrence probability are stored together with calculation time in this history database 405. This non-target policy monitoring program 110 executes the above-described processing for all the monitor items (S1005).

Next, the non-target policy monitoring program 110 searches for the occurrence probabilities of the causal events for each propagation rule and applies the calculated occurrence probability values of the causal events, thereby calculating the occurrence probability of the threat (S1006). When doing so, the monitor items related to the causal events of the propagation rule may sometimes be policy setting targets. In this case, the non-target policy monitoring program 110 reads the result monitored by the security policy management program 109 and uses it as the occurrence probability of the threat. The non-target policy monitoring program 110 stores the calculated occurrence probability of the threat in the history database 405.

Furthermore, the non-target policy monitoring program 110 evaluates the occurrence probability history about the relevant propagation rule based on the probability history database 405 and determines whether or not it is necessary to implement specific output to the user according to the evaluation result, based on whether the occurrence probability history meets the output criteria or not (S1007). The output criteria is, for example, a threshold defined in advance; and if the occurrence probability is equal to or more than the threshold, the specific output is implemented.

As another example, the non-target policy monitoring program 110 judges a differential of a change of the above-described calculated value after the elapse of time, that is, a difference from the value calculated last time; and if the difference is equal to or more than a specific value or if a calculated high value continues for a certain period of time, the non-target policy monitoring program 110 implements the specific output. As another example, the non-target policy monitoring program 110 is allowed to create a predicted history graph, and uses it as the criteria for implementing the specific output even when there is no tendency for the calculated value to match the predicted history graph. Regarding such output criteria, which criteria should be used, and its reference value are set by the program in advance. Furthermore, the setting may be made so that a plurality of output criteria such as the threshold and the difference will be used at the same time.

If the occurrence probability history meets the criteria as a result of the judgment, the non-target policy monitoring program 110 implements the specific output (S1008). This non-target policy monitoring program 110 outputs, as the specific output, for example, a specific causal event, for which the occurrence probability has changed significantly, from among events which can possibly be the causes, and a countermeasure to reduce the occurrence probability of this specific causal event. Specifically speaking, this non-target policy monitoring program 110 displays, as output information, the threat event and its probability as well as information regarding the causal event(s) which caused the occurrence probability of the threat event to change. Incidentally, a numerical value of the occurrence probability may be displayed as the numerical value without any modification as shown in the drawing or, for example, as a level defined in a plurality of ranks.

Furthermore, the non-target policy monitoring program 110 may search the policy management table 109 for a policy corresponding to the relevant monitor item as a countermeasure against the relevant causal event and output the found policy together with the above-mentioned output information. Meanwhile, regarding threats and their causes for which no countermeasures can be taken at the user terminal 102, the non-target policy monitoring program 110 may manage countermeasure-handling device candidates (for example, a server or network equipment) by using a propagation rule table (not shown in the drawing) and also implement the specific output.

When doing above, the management server 101 may include a countermeasure implementation module (not shown in the drawing) for implementing the countermeasure, which is output as described above, on the user terminal 102 in which the causal event may possibly occur. Incidentally, in this case, this countermeasure implementation module may implement the above-mentioned countermeasure in a device other than the user terminal 102, such as a mail server or a file server (not shown in the drawing).

The non-target policy monitoring program 110 judges whether the calculation has been performed for all the propagation rules or not; and if there is a propagation rule for which the calculation has not been performed, the processing proceeds to step S1006 described above; and if the calculation has been performed for all the propagation rules, the non-target policy monitoring program 110 terminates the processing (S1009).

As a result, even the items (which correspond to the non-set items) other than the items set as policies are managed with respect to events which can cause threats (which correspond to the causal events), so that the administrator can be notified at appropriate timing that, for example, the threat occurrence probability has increased. Therefore, it is possible to allow the administrator to recognize threats and take necessary countermeasures by providing information about threats, which become increasingly likely to be actualized, their causes, and countermeasures against them also with respect to potential threats which are not recognized by the administrator and are not targets of the security policies.

(2-5) Variations of First Embodiment (2-5-1) First Variation

Next, a method for properly notifying the administrator of the cause of the threat occurrence by evaluating a change of the monitor item(s) will be explained. This section describes a method for calculating the occurrence probability of a threat event when the non-target policy monitoring program 110 evaluates a change of each monitor item and if the occurrence probability of the monitor item changes.

Figure 11:
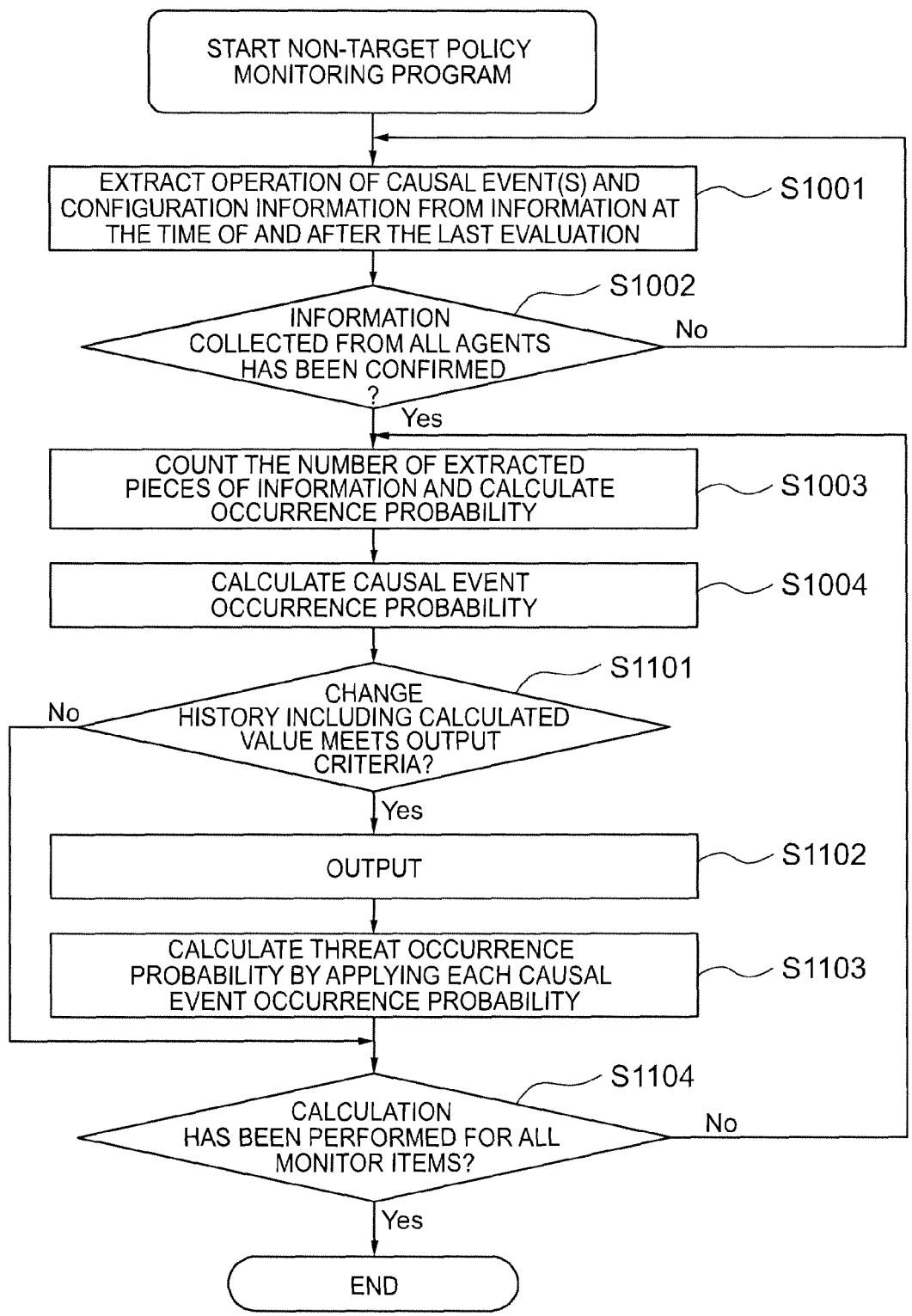
FIG. 11 is a flowchart illustrating an example of a processing sequence executed by the non-target policy monitoring program according to a variation of the first embodiment.

FIG. 11 shows a flowchart of the non-target policy monitoring program 110. Part of the processing in this flowchart including processing for calculating the occurrence probability of the causal event (corresponding to step S1001 to S1004) is the same as the processing in the flowchart explained with reference to FIG. 10.

The non-target policy monitoring program 110 stores the calculated result as the history and evaluates the history result. The non-target policy monitoring program 110 judges whether the history meets output criteria or not (S1101). As the output criteria used herein, a predefined reference value is used as in cases, for example, where the difference obtained by comparing the latest calculated value with the value calculated last time is equal to or more than a certain value or where a value equal to or more than a threshold continues for a certain period of time. The same reference value may be used for all the items or a reference value may be set to each monitor item.

If the history meets the output criteria, the non-target policy monitoring program 110 may implement output with respect to the result of the relevant monitor item (S1102). Furthermore, the non-target policy monitoring program 110 may calculate the occurrence probability with respect to the threat event including the relevant monitor item and implement output in accordance with the result evaluated in the same manner as the method described earlier with reference to FIG. 10. This method can simplify the processing because the calculation is not performed with respect to the threat(s) for which the probability of the causal event does not change.

Furthermore, when the change of the occurrence probability of the monitor item is evaluated in the first variation, the number of pieces of extracted information of the gathered result may be used, instead of the occurrence probability, as the value used for evaluation of the change. In this case, the output criteria for the number of pieces of extracted information is predefined, wherein it is determined that whether the history meets the output criteria or not.

(2-5-2) Second Variation

As a result of monitoring of causal events as described in the first embodiment, the occurrence probability of a causal event may sometimes become 0 (for example, when the HDD passwords are set to all the user terminals 102 at some specific point in time). This section will describe a method for evaluating whether a change of other causal events might influence the occurrence probability of the threat or not, even when the occurrence probability of a certain causal event is 0.

Figure 12:
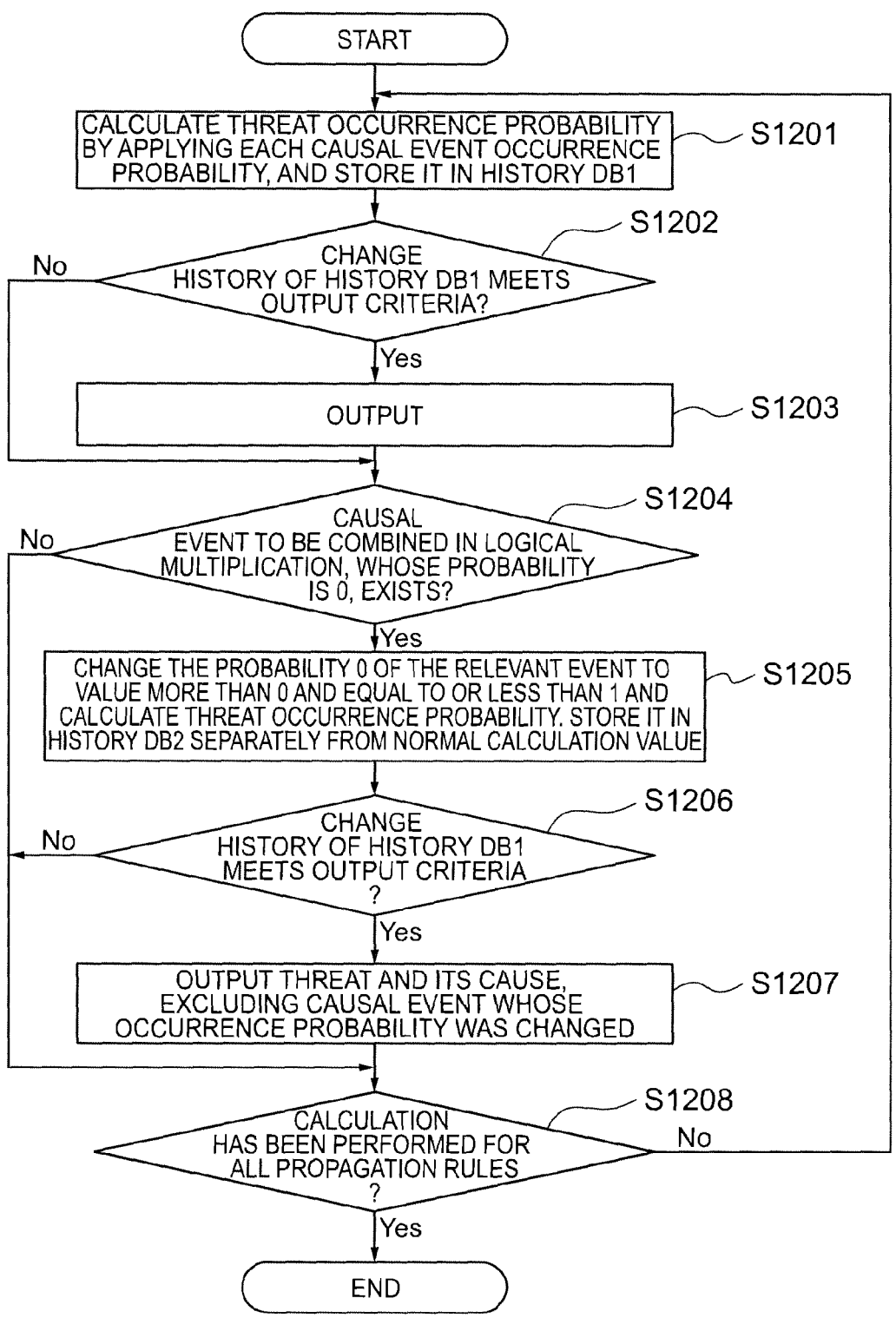
FIG. 12 is a flowchart illustrating an example of a processing sequence executed by the non-target policy monitoring program according to a variation of the first embodiment.

FIG. 12 shows a flowchart of part of processing by the non-target policy monitoring program 110. Part of the processing in this flowchart including calculation of the occurrence probability for each monitor item (S1001 to S1005) is the same as the processing in the flowchart shown in FIG. 10. By the method explained in the first embodiment, even if there is 0 in one of the monitor items, the value 0 is directly applied to the propagation rule. The same applies to S1201 to S1203 in the flowchart shown in FIG. 12. In this case, two databases 405 are retained and the calculated value is stored without any modification in a first history database 405. For example, if the HDD passwords are set to all the monitor items, the occurrence probability of the threat calculated by a combination of the Logical multiplication is 0, which is then stored in the first history database 405.

If the occurrence probability of a causal event is 0, even if the probabilities of other causal events change, the occurrence probability of the threat is 0, which will not change. Therefore, the non-target policy monitoring program 110 checks whether there is any causal event whose occurrence probability is 0 (S1204); and then changes the item of 0 to a specific value more than 0 and equal to or less than 1 (for example, 0.01) so that the influence of changes of other causes can be checked. The non-target policy monitoring program 110 calculates the occurrence probability of the threat by using the specific value and stores it in the second history database 405 (S1205). Furthermore, a table (not shown in the drawing) is used to manage the probability of such causal event which is the specific value. Then, the non-target policy monitoring program 110 checks it with the output criteria (S1206); and if it is determined to implement output, the non-target policy monitoring program 110 excludes the causal event, for which the specific value was used, and outputs information regarding the causal event(s) which has changed, and the occurrence probability of the threat (S1207).

As a result of such second variation, even if there is no possibility that any one of a plurality of causes may occur (whose occurrence probability is 0), it is possible to judge whether other causal events may influence a change of the occurrence probability of the threat.

(3) Second Embodiment

Next, a method for automatically changing a policy when the occurrence probability of a threat event has increased, in the second embodiment of the present invention will be explained. Since the second embodiment is almost similar to the first embodiment, the explanation will be focused on only the difference between them.

(3-1) Processing by Non-Target Policy Monitoring Program

FIG. 13 shows a flowchart of the non-target policy monitoring program 110 in the second embodiment. Since part of processing in the second embodiment including processing for evaluating the occurrence probability of the threat event (corresponding to step S1001 to S1008) is the same as the processing in the above-described first embodiment, an explanation of the same content has been omitted.

If the history meets the criteria as a result of the evaluation, the non-target policy monitoring program 110 makes judgment with respect to an item which caused a change of the occurrence probability of the threat, from among the occurrence probabilities of causal events. Examples of such judgment include a case where the occurrence probability of the causal event itself has changed and the difference from the calculated differential value by that of the last time is large or exceeds a threshold. Specifically speaking, after the execution of step S1008, the non-target policy monitoring program 110 refers to the policy management table 112 with respect to, for example, an item, from among the non-set items, for which the change of the occurrence probability of the causal event after the elapse of time is larger than a specific value, and automatically changes the policy setting, for example, according to a specified countermeasure (S1301). Incidentally, a command for this automatic setting is expressed with an arrow from the non-target policy monitoring program 110 to the security policy management program 109 in FIG. 2 described earlier.

The policy setting change by the non-target policy monitoring program 110 is reported to the security policy management program 109 and the security policy management program 109 then distributes the changed policy to the agent program 114. Furthermore, when automatically changing the policy, the non-target policy monitoring program 110 implements output to report it to the administrator. As a result, if the potential possibility of a potential threat, which is not recognized by the administrator and is not a policy target, has increased, it is possible to constantly suppress security risks without having the administrator be aware of the risks.

Under this circumstance, before automatically changing the policy in accordance with the above-described evaluation result, the non-target policy monitoring program 110 may output an interface for selecting whether the change can be made or not. As a result, the administrator will be given the opportunity to judge whether the policy really needs to be changed or not, and it is possible to ensure safety with regard to an action which might influence the security significantly, that is, the policy change. If Change Possible is selected according to the input from the administrator, the non-target policy monitoring program 110 changes the policy; and if No is selected, the non-target policy monitoring program 110 does not change the policy.

(3-2) Regarding Another Method

As another idea of this method, there is a method for excluding a set policy when satisfied with a reference value in case of the occurrence probability of a threat event is low (lower than a threshold). As a result, even when the operation is started with a minimum policy setting, the policy setting according to the operation status can be made by monitoring the operation status and setting necessary policies such as operation suppression when the threat occurrence probability increases.

According to the above-described embodiment, information is output also with regard to an item(s) which is not a target of security policies, if the occurrence of the item is detected by monitoring and output conditions are satisfied. There is a possibility that the administrator might consider it unnecessary to manage the item which is not a target of the security policies. If the administrator is notified of the occurrence of the item every time the occurrence is detected, the burden on the administrator will possibly increase. Therefore, the burden on the administrator can be reduced by outputting information when the occurrence frequency increases or the probability of threat actualization is becoming high.

Furthermore, the occurrence may increase due to a change of the usage by users, for example, in a case where a portable PC(s) of a lightweight type is used and an increasing number of users take out the PCs, even with respect to items which were determined by the administrator at the time of designing policies to be unnecessary. In the present embodiment, such a change is monitored and output, so that the administrator can judge whether the relevant item should be a policy target or not.

(4) Other Embodiments

The above-described embodiments are examples given for the purpose of describing this invention, and it is not intended to limit the invention only to these embodiments. Accordingly, this invention can be utilized in various ways unless the utilizations depart from the gist of the invention. For example, processing sequences of various programs have been explained sequentially in the embodiments described above; however, the order of the processing sequences is not particularly limited to that described above. Therefore, unless any conflicting processing result is obtained, the order of processing may be rearranged or concurrent operations may be performed.

REFERENCE SIGNS LIST

100 System
101 Management server
102 User terminal
108 Monitor item table
109 Security policy management program
110 Non-target policy monitoring program
111 Collection program
112 Policy management table
113 Propagation rule management table
114 Agent program

The invention claimed is:

1. A security monitoring apparatus for managing at least one terminal device, comprising:
    a CPU; and
    a memory operable connected to the CPU and storing a management program a collection program, and a non-target policy monitoring program;
    the management program, when executed by the CPU and, when applying a security policy to each of the terminal devices, manages the security policy by classifying items of the security policy into a set item which is set as an item of the security policy and a non-set item which is not set as an item of the security policy;
    the collection program, when executed by the CPU, monitors the occurrence of a causal event, which may possibly cause a threat with respect to the non-set item on each of the terminal devices, and collects information regarding the occurrence of the causal event;
    the non-target policy monitoring program, when executed by the CPU, a change of the causal event based on the information regarding the causal event.

2. The security monitoring apparatus according to claim 1, wherein the collection program, when executed by the CPU, obtains an operation log in accordance with operation by a user and configuration information regarding the configuration of each of the terminal devices from each of the terminal devices.

3. The security monitoring apparatus according to claim 2, wherein the non-target policy monitoring program, when executed by the CPU, calculates an occurrence probability of the causal event with respect to the non-set item as evaluation of whether the change of the causal event is equal to or more than the reference value or not, and calculates an occurrence probability of a threat calculated based on the occurrence probability of the causal event with respect to the non-set item; and if a differential of a change of the calculated value after the elapse of time is equal to or more than a specific value or if the calculated value is equal to or more than a predetermined threshold, the non-target policy monitoring program, when executed by the CPU, implements the specific output.

4. The security monitoring apparatus according to claim 3, wherein the non-target policy monitoring program, when executed by the CPU, calculates the occurrence probability of the threat by using a combination of logical multiplication or logical sum of occurrence probabilities of one or more causal events.

5. The security monitoring apparatus according to claim 4, wherein the non-target policy monitoring program, when executed by the CPU, outputs, as the specific output:
 a specific causal event whose occurrence probability changes significantly, from among events which may possibly be the cause; and
 a countermeasure to reduce the occurrence probability of the specific causal event.

6. The security monitoring apparatus according to claim 5, wherein the non-target policy monitoring program, when executed by the CPU, automatically changes the security policy with respect to an item, from among the non-set items, for which the change of the occurrence probability of the causal event is greater than a specific value.

7. The security monitoring apparatus according to claim 6, further comprising a countermeasure implementation module configured to implement the output countermeasure on the terminal device in which the causal event may possibly occur.

8. The security monitoring apparatus according to claim 7, wherein the countermeasure implementation module is configured to implement the countermeasure on another device other than the terminal device.

9. A security monitoring method for managing a system including at least one terminal device, comprising:
 a management step of managing by a computer, when applying a security policy to each of the terminal devices, the security policy by classifying items of the security policy into a set item which is set as an item of the security policy and a non-set item which is not set as an item of the security policy;
 a collection step of monitoring by the computer the occurrence of a causal event, which may possibly cause a threat with respect to the non-set item on each of the terminal devices, and collecting information regarding the occurrence of the causal event; and
 a non-target policy monitoring step of evaluating by the computer a change of the causal event based on the information regarding the causal event.

10. The security monitoring method according to claim 9, wherein the collection step comprises obtaining an operation log according to operation by a user and configuration information regarding the configuration of each of the terminal devices from each of the terminal devices.

11. The security monitoring method according to claim 10, wherein the non-target policy monitoring step comprises calculating an occurrence probability of the causal event with respect to the non-set item as evaluation of whether or not the change of the causal event is equal to or more than the reference value, and calculating an occurrence probability of a threat calculated based on the occurrence probability of the causal event with respect to the non-set item; and
 if a differential of a change of the calculated value after the elapse of time is equal to or more than a specific value or if the calculated value is equal to or more than a predetermined threshold, the non-target policy monitoring step comprises implementing the specific output.

12. The security monitoring method according to claim 11, wherein the non-target policy monitoring step comprises calculating the occurrence probability of the threat by using a combination of logical multiplication or logical sum of occurrence probabilities of one or more causal events.

13. The security monitoring method according to claim 12, wherein the non-target policy monitoring step comprises outputting, as the specific output:
 a specific causal event whose occurrence probability changes significantly, from among events which may possibly be the cause; and
 a countermeasure to reduce the occurrence probability of the specific causal event.

14. The security monitoring method according to claim 13, wherein the non-target policy monitoring step comprises automatically changing the security policy with respect to an item, from among the non-set items, for which the change of the occurrence probability of the causal event is greater than a specific value.

15. The security monitoring method according to claim 14, further comprising implementing the output countermeasure on the terminal device in which the causal event may possibly occur.

16. The security monitoring method according to claim 15, further comprising implementing the countermeasure on a device other than the terminal device.

17. A non-transitory computer readable medium storing a security monitoring program comprising the following programs executed in a computer:
 a management program, when executed by the computer, when applying each security policy to at least one terminal device, manages the security policy by classifying items of the security policy into a set item which is set as an item of the security policy and a non-set item which is not set as an item of the security policy;
 a collection program, when executed by the computer, monitors the occurrence of a causal event, which may possibly cause a threat with respect to the non-set item on each of the terminal devices, and collects information regarding the occurrence of the causal event; and
 a non-target policy monitoring program, when executed by the computer, evaluates a change of the causal event based on the information regarding the causal event and implements specific output if the change of the causal event is equal to or more than a reference value.

18. A security monitoring method for a system including at least one terminal device, comprising;
 managing by a computer, when applying a security policy to each of the terminal devices, the security policy by classifying items of the security policy into a set item which is set as an item of the security policy and a non-set item which is not set as an item of the security policy,
 monitoring by the computer the occurrence of a causal event which may possibly cause a security threat;
 calculating by the computer an occurrence probability thereof and an occurrence probability of an influenced threat based on the occurrence probability of the causal event; and
 evaluating by the computer a change of the calculated value after the elapse of time and implementing specific output if the change is equal to or more than a reference value.

19. The security monitoring apparatus according to claim 1, wherein the non-target policy monitoring program, when executed by the CPU, implements specific output if the change of the causal event is equal to or more than a reference value.

20. The security monitoring method according to claim 9, wherein the non-target policy monitoring step further comprises implementing specific output if the change of the causal event is equal to or more than a reference value.

* * * * *